(No Model.)
L. POPPER.
BUTTON.
No. 352,886. Patented Nov. 16, 1886.
Fig. 1.
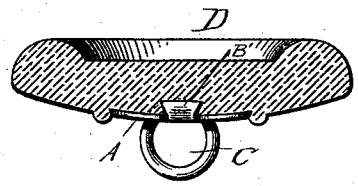
Fig. 2.
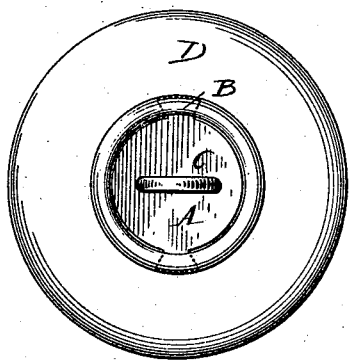
Fig. 3.  Fig. 4.
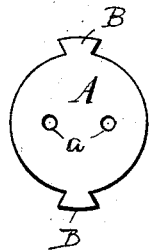 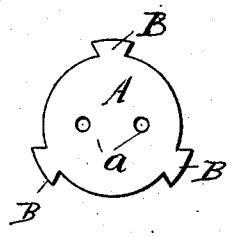
WITNESSES:
R. N. Rosenbaum.
Martin Petry.
INVENTOR
Leo Popper
BY
Joepel & Jaegener
ATTORNEY

UNITED STATES PATENT OFFICE.

LEO POPPER, OF NEW YORK, N. Y.

BUTTON.

SPECIFICATION forming part of Letters Patent No. 352,886, dated November 16, 1886.

Application filed September 4, 1886. Serial No. 212,707. (No model.)

*To all whom it may concern:*

Be it known that I, LEO POPPER, of the city, county, and State of New York, have invented certain new and useful Improvements in Buttons, of which the following is a specification.

Heretofore the shanks of buttons made of glass or composition have been fastened in different ways, but most of them proved to be imperfect, as the shanks become detached in a very short time.

The object of my invention is to fasten the shank permanently and securely to a glass or like button in such a manner that it cannot become detached.

The invention consists in a plate having wedge-shaped prongs or anchors, which are embedded in the under side of the closed button when the glass or composition is in a soft state, the shank being fastened to said plate.

In the accompanying drawings, Figure 1 is a cross-sectional view of a button provided with my improved shank. Fig. 2 is a face view of the under side of the same. Figs. 3 and 4 are face views of the pronged plate.

Similar letters of reference indicate corresponding parts.

The plate A, which is preferably made of circular shape, but can be made of any other desired shape, is provided at its rim with two or more wedge-shaped or dovetailed lugs, prongs, or extensions, B, which are turned up to project from the upper surface—that is, that surface resting against the button. The shank C is fastened on the under side of the plate A in any suitable and well-known manner. For instance, it may consist of a ring passed through apertures $a$ in the plate A, or it may be soldered or riveted on. The plate A is placed into the mold and the soft glass pressed into the mold, whereby the prongs or anchors B are embedded in the glass, and when the glass hardens are held firmly and securely in the same. The plate A is thus firmly attached to the under side of the button D, and cannot be withdrawn.

If desired, the central part of the plate A can be depressed to form a shank.

Having thus described my invention, I claim as new and desire to secure by Letters Patent—

1. The combination, with a glass button, of a plate provided on its rim with dovetailed lugs or projections passed into the body of the button, substantially as shown and described.

2. The combination, with a glass button, of a plate resting against the under side of the button, and provided on its rim with dovetailed or wedge-shaped projections which pass into the body of the button, and of a shank on said button, substantially as shown and described.

In testimony that I claim the foregoing as my invention I have signed my name in presence of two subscribing witnesses.

LEO POPPER.

Witnesses:
 OSCAR F. GUNZ,
 MARTIN PETRY.